United States Patent

[11] 3,616,362

[72] Inventor Anthony C. Soldatos
 Kendall Park, N.J.
[21] Appl. No. 718,225
[22] Filed Apr. 2, 1968
[45] Patented Oct. 26, 1971
[73] Assignee Union Carbide Corporation
 The portion of the term of the patent
 subsequent to June 14, 1983, has been
 disclaimed.

[54] METHOD OF IMPROVING THE TACK OF ETHYLENE-PROPYLENE POLYMERS BY RADIATION
 25 Claims, No Drawings

[52] U.S. Cl. .................................................. 204/159.14,
 204/159.2, 260/23, 260/33.6, 260/41, 260/94.7,
 260/889, 260/897, 260/948
[51] Int. Cl. ..................................................... B01j 1/00,
 C07f 9/02, C08f 29/2

[50] Field of Search .............................................. 260/848;
 204/159.14

[56] References Cited
 UNITED STATES PATENTS
 3,256,368 6/1966 Soldatos .................... 260/848
 3,294,866 12/1966 Soldatos .................... 260/848

Primary Examiner—Murray Tillman
Assistant Examiner—Richard B. Turer
Attorneys—Paul A. Rose, Aldo J. Cozzi and James C. Arvantes ABSTRACT: This invention relates to a method of improving the tack of ethylene-propylene polymers in a relatively short period of time by adding thereto a polymeric phenolic tackifier and exposing the resultant compositions to ionizing radiation or nonionizing radiation.

METHOD OF IMPROVING THE TACK OF ETHYLENE-PROPYLENE POLYMERS BY RADIATION

This invention relates to a method of improving the tack of ethylene-propylene polymers. More specifically, this invention relates to a method of improving the tack of ethylene-propylene polymers in a very short period of time, in some instances on the order of seconds, by adding to the ethylene-propylene polymers, a polymeric phenolic tackifier and thereafter subjecting the resultant compositions to ionizing radiation or nonionizing radiation.

It has been found that the tack of ethylene-propylene polymers can be significantly improved by the addition thereto of polymeric phenolic tackifiers, as for example, phenol-formaldehyde resins and phenolated polymers of isoprene. Development of a significant degree of tack in such compositions, however, requires that these compositions be aged for a period of hours as a rule under controlled conditions of temperature and humidity. As an illustration, a composition containing 5 percent by weight of a polymer of isoprene phenolated with p-dodecylphenol (identified subsequently in this application as polymer B), based on the weight of an ethylene-propylene polymer, generally requires an aging period of about 96 hours, at a temperature of 75° F. while under a relative humidity of 12 percent, in order to achieve a degree of tack wherein strips produced therefrom and subjected to the test for tack (described in detail subsequently in this application) are nonseparable.

The present invention provides for significantly improving the tack of ethylene-propylene polymers, to which have been added polymeric phenolic tackifiers, in some instances in a matter of seconds and without any special regard for conditions of temperature and relative humidity.

According to the present invention, the tack of ethylene-propylene polymers is significantly improved, in a short period of time, by adding thereto a polymeric phenolic tackifier and subjecting the resultant compositions to ionizing radiation or nonionizing radiation.

Illustrative of polymers of isoprene which are phenolated and are the preferred tackifiers of this invention, are homopolymers of isoprene which generally have a number average molecular weight of about 500 to about 30,000, preferably a number average molecular weight of about 500 to about 10,000 and more preferably have a number average molecular weight of about 1,000 to about 8,000; and which contain less than about 50 percent by weight and preferably less than about 20 percent by weight internal unsaturation (based on the weight of the total unsaturation).

Number average molecular weight was determined by vapor phase osmometry.

Total unsaturation was determined by Wijs method (modified by correcting for substitution reactions).

Internal unsaturation was determined by nuclear magnetic resonance and infrared analysis.

Internal unsaturation as used herein refers to unsaturated units which makeup the backbone of the polymer as opposed to pendant unsaturated units.

For instance, internal unsaturation with respect to polyisoprene refers to the percent by weight of the diene units of isoprene (2-methyl butadiene-1,3) which have combined at the 1,4 position as opposed to the 1,2 and 3,4 positions.

1,4-position

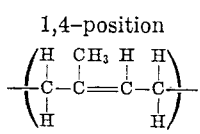

1,2-position

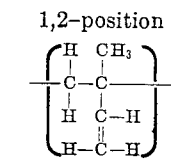

3,4-position

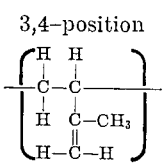

It is to be understood that homopolymers of isoprene as used herein are intended to include halogenated, hydrogenated and other like homopolymers of isoprene.

Preparation of polymers of isoprene, particularly homopolymers of isoprene, having the number average molecular weight and the unsaturation previously described can be conducted as described in this application and also as described in the following articles.

QUARTERLY REVIEW, Vol. 16, page 361—1962 "Stereo Regular Addition Polymerization" C. F. H. Bawan and A. Ledwith JOURNAL OF POLYMER SCIENCE, Vol. 3, pages 2223-28, 1965 "Solvent Effects in Anionic Copolymerization Reactivity of Dienes" K. F. O'Driscoll JOURNAL OF POLYMER SCIENCE, Vol. 27—1957 "-Polymerization of Isoprene with Lithium Dispersions and Lithium Alkyls using Tetrahydrofuran as Solvent" Henry Hsieh, D. J. Kelly, A. V. Tobolsky JOURNAL OF POLYMER SCIENCE, Vol. 40, pages 73—89, 1959 "Isoprene Polymerization by Organometallic Compounds" A. V. Tobolsky, C. E. Rogers.

Among other suitable polymers of isoprene are those obtained by polymerizing isoprene with one or more of a compound having at least one olefinic double bond to obtain a copolymer or interpolymer having the number average molecular weight and the internal unsaturation previously defined and containing at least about 70 percent by weight combined isoprene. Exemplary of suitable monomers having at least one olefinic double bond are described subsequently in this application. These polymers can be hydrogenated, halogenated and the like as previously described.

Among suitable phenols which can be used to phenolate the polymers of isoprene are those compounds which have the formula:

Formula I

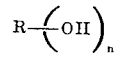

wherein R is an aromatic hydrocarbon radical generally containing a maximum of 31 carbon atoms and preferably containing a maximum of 21 carbon atoms and $n$ is an integer having a value of 1 to 3 inclusive.

Especially desirable phenols are those having the formula:

Formula II

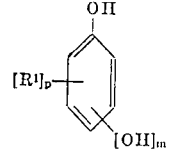

wherein each $R^1$, which can be the same or different, is an alkyl radical generally containing a maximum of 25 carbon atoms and preferably containing a maximum of 15 carbon atoms, an alkoxy radical generally containing a maximum of 25 carbon atoms and preferably containing a maximum of 15 carbon atoms, a cycloaliphatic radical generally containing a maximum of 25 carbon atoms and preferably containing a maximum of 12 carbon atoms, nitro, sulfone, sulfur, or halogen, i.e., chlorine, bromine, fluorine or iodine; $p$ is an integer having a value of 0 to 5 inclusive, $m$ is an integer having a value of 0 to 3 inclusive and the maximum sum of $p+m-5$.

Illustrative of suitable phenols are the following: phenol, nitrophenol, thiophenol, alkylated phenols such as m-cresol, o-ethyl phenol, m-ethyl phenol, p-isopropyl phenol, p-tert-butyl phenol, o-amyl phenol, p-hexyl phenol, p-nonyl phenol, p-octyl phenol, o-nonyl phenol, p-dodecyl phenol, o-dodecyl phenol, 2,6-di-nonyl phenol, 2,4-diethyl phenol, 2,4-di-hexyl phenol, 2,4-dinonyl phenol, 2,4-didodecyl phenol, 2,3,5-triethyl phenol, 2,3,5-trihexyl phenol, 2,3,5-triheptyl phenol, 2,3,4,5-tetrahexyl phenol and other like phenols, as well as the commercially available meta-cresol which contains small amounts of both the para and the ortho isomers; alkoxylated phenols, exemplary of which are m-methoxy phenol, o-methoxy phenol, p-methoxy phenol, m-hexoxy phenol, o-hexoxy phenol, p-hexoxy phenol, 2,4-dimethoxy phenol, 2,4-di-hexoxy phenol, 2,3,5-trimethoxy phenol, 2,3,5-trihexoxy phenol, 2,3,4,5-tetrahexoxy phenol and the like; halogenated phenols such as ortho, meta or para bromo phenol; 2,4-dichlorophenol, 2,3,5-trichlorophenol, 3-chloror-4-methyl phenol, 4-bromo-6-ethoxy phenol and the like; styryl phenol, cymyl phenol, α-methyl styryl phenol and the like; polyhydric phenols such as pyrocatechol, hydroquinone, resorcinol and the like; alkylated dihydroxy phenols such as 1,3-dihydroxy-4-methylbenzene, 1,2-dihydroxy-4-hexylbenzene and the like; alkoxylated dihydroxy phenols such as 1,4-dihydroxy-3-hexoxybenzene and the like; cycloaliphatic phenols such as p-cyclopentyl phenol, p-cyclohexyl phenol and the like; halogenated dihydroxy phenols such as 1,2-dihydroxy-4-chlorobenzene and the like; trihydric phenols such as phloroglucinol, pyrogallol and the like; polynuclear phenols such as 2,2-bis(p-hydroxyphenyl)-propane and the like.

As a general rule, the phenolated polymers of isoprene contain about 5 to about 75 percent by weight and preferably about 10 to about 40 percent by weight combined phenol based on the total weight of the polymer.

Phenolated polymers of isoprene can be prepared as described in this application and also as described in U.S. Pat. No. 3,177,166, issued Apr. 6, 1965, to J. T. Gregory et al.

Other suitable phenolic tackifiers are the phenol-formaldehyde resins which are generally produced by reacting an alkylated phenol with formaldehyde in the presence of an acid or alkaline catalyst, as for example oxalic acid and sodium hydroxide. Suitable phenols are the alkylated phenols of Formula II wherein $R^1$ preferably has 9 to 25 carbon atoms inclusive. These phenols are further described in U.S. Pat. No. 3,294,866.

Suitable ethylene-propylene polymers for this invention are those which can be cured to elastomeric products. Among such suitable polymers are the copolymers and interpolymers containing at least about 20 percent by weight combined ethylene, preferably about 20 to about 80 percent by weight combined ethylene and at least about 20 percent by weight combined propylene.

Among suitable polymers, as previously stated are copolymers of ethylene-propylene and interpolymers of ethylene-propylene and a polymerizable monomer having at least one olefinic double bond wherein, in each case, the combined ethylene and combined propylene are as defined above.

Illustrative of suitable mono-olefinic compounds are those having the formula:

$$R^2-CH=CH_2$$

wherein $R^2$ is a monovalent hydrocarbon radical generally containing a maximum of 10 carbon atoms and preferably containing a maximum of 8 carbon atoms. Among such monovalent hydrocarbon radicals are the alkyl radicals such as ethyl, propyl, hexyl, 2-ethylhexyl and the like; aromatic radicals such as phenyl, naphthyl and the like; cycloalipatic radicals such as cyclohexyl, n-propyl cyclohexyl and the like.

Methods for preparing copolymers of ethylene-propylene and interpolymers of ethylene-propylene and a mono-olefinic compound are described in detail in U.S. Pat. Nos. 3,000,867 to B. S. Fisher and 2,975,159 to V. Weinmayr, respectively.

Suitable diene monomers which can be used to produce interpolymers and methods for polymerizing these diene monomers with ethylene and propylene are described in U.S. Pat. Nos. 3,000,866 to R. E. Tarney and 3,211,709 to S. Adamek et al.

Especially desirable diene monomers are hexadiene-1,4 dicyclopentadiene, ethylidenebicycloheptene and the like.

In carrying out the present invention, the tackifiers are added to the ethylene-propylene polymers in amounts sufficient to increase the tack thereof. As a rule, this amount is at least about 1 percent by weight tackifier based on the weight of ethylene-propylene polymer, and generally about 8 to about 100 percent by weight. Particularly effective results are achieved using from about 5 to about 20 percent by weight tackifier based on the weight of the ethylene-propylene polymer.

It is to be understood that mixtures of tackifiers and/or mixtures of ethylene-propylene polymers can be used if so desired. The addition of one to the other can be carried out on a two-roll mill, in a Banbury mixer or a twin screw extruder.

Once the compositions are formulated, they are generally formed into sheet form, as for example, on a two-roll mill and subjected to electric discharge, ionizing radiation or nonionizing radiation. The treatment, as described, can be conducted under atmospheric, subatmospheric or superatmospheric pressure generally on the order of about 1 mm. of Hg pressure to about 3 atmospheres pressure. Atmospheric pressure is preferred. Also, with nonionizing radiation it is preferred to conduct the treatment in an atmosphere containing oxygen, for instance air.

Nonionizing radiation can be exemplified by ultraviolet radiation, visible light such as fluorescent light, infrared light, radiation from dielectric heaters and other like radiation. Ionizing radiation can be illustrated by β-radiation, γ-radiation, α-radiation, X-rays machine generated electrons, as for example, electrons generated by a Vander Graff generator.

The period of time to which each composition is treated, as described, will depend upon the concentration of the tackifier, the exact formulation of the compositions as well as the type of treatment utilized.

To the compositions of this invention can be added pigments, fillers, lubricants, plasticizers, curing agents, accelerators, stabilizers, antioxidants, other rubbers such as styrene-butadiene-1,3 rubbers and the like as is well known in the art. Specific additives are pigments such as carbon black and clay; lubricants such as stearic acid and plasticizers such as naphthenic oils.

In those instances wherein the compositions of this invention contain a polymer of ethylene-propylene which is devoid of olefinic unsaturation for instance, a copolymer of ethylene and propylene, or an interpolymer of ethylene-propylene and a mono-olefinic compound, the compositions can be cured to elastomeric products using an organic peroxide such as dicumyl peroxide. In those instances wherein the polymer of ethylene-propylene contains olefinic unsaturation such as an interpolymer of ethylene-propylene and hexadiene-1,4 the compositions can be cured to elastomeric products using sulfur.

The amount of curing agent, the length of the curing cycle and the temperature thereof will depend, in each instance upon the exact formulation of the compositions, as for example, is described in U.S. Pat. No. 3,200,174 and also as described in this application.

It is to be understood that the disclosure of all patents and literature references are incorporated herein by reference.

In order to demonstrate the excellent "tack" effected by the method of this invention, various compositions were formulated, formed into strips—1 inch by 6 inches by one-eighth of an inch, and treated as described.

The test for tack was carried out by pressing two such strips together using a 2-pound roller and then manually pulling the strips apart. "Tack" was judged on the bases of the difficulty encountered in attempting to manually separate the strips.

The various polymers used in formulating the compositions were prepared as follows:

Preparation of Polymer A—Polyisoprene

Into a 2-liter flask equipped with a stirrer, reflux condenser and dropping funnel, there was distilled 1,000 ml. of tetrahydrofuran which had been dried using lithium aluminum hydride. During this distillation the system was continuously purged with nitrogen gas. To the distilled tetrahydrofuran there was first added 0.130 mole of butyl lithium in 80 ml. of n-heptane and then 122 grams of isoprene in 6.8 gram portions over a period of 1 hour. During the addition of the isoprene, the temperature of the reaction mixture was maintained at 50°-55° C. After the addition of the isoprene, the reaction mixture was maintained at a temperature of 60° C. for 2 hours while being constantly stirred. Methanol was added to the mixture and the product polyisoprene was recovered as the methanol insoluble portion of the mixture. The polyisoprene was stabilized by adding thereto 0.05 gram of 2,6-di-t-butyl-4-methylphenol and then dried by being placed in a vacuum oven for 18 hours. The vacuum oven was at a temperature of 40° C. and was operating under a pressure of 5 mm. Hg.

Analysis:
| | |
|---|---|
| Number average molecular weight | = 2000 |
| Percent internal unsaturation | = 5 |
| Yield | = 116 grams of a viscous liquid |

Preparation of Polymer B—Phenolated Polyisoprene

Into a 2-liter flask equipped with a stirrer and reflux condenser, there was charged 602 grams of p-dodecyl phenol and 40 grams of polyisoprene (polymer A). To this mixture there was then added 10.4 grams of p-toluene sulfonic acid and the reaction mixture heated to a temperature of about 80° C. and maintained at this temperature for 7 hours while under a nitrogen gas atmosphere. After this 7-hour period, the reaction mixture was allowed to stand for 24 hours at a temperature of about 30° C. The phenolated polyisoprene was recovered as described with respect to polymer A.

Analysis:
| | |
|---|---|
| Number average molecular weight | = 2700 |
| Melting point | = 87° C.–92° C. |
| Percent by weight combined p-dodecyl phenol | = 23 based on the total weight of the isoprene polymer |
| Percent internal unsaturation | = 5 |

Preparation of Polymer C—Phenolated Polyisoprene

Into a 2-liter flask equipped with a stirrer and reflux condenser, there was charged 520 grams of p-nonyl phenol and 40 grams of polyisoprene (polymer A). To this mixture there was then added 10.4 grams of p-toluene sulfonic acid and the reaction then carried out in a manner described for polymer B.

Analysis:
| | |
|---|---|
| Number average molecular weight | = 2600 |
| Melting point | = 92° C.–98° C. |
| Percent by weight combined p-nonyl phenol | = 20 based on the total weight of the isoprene polymer |
| Percent internal unsaturation | = 5 |

Preparation of Polymer D—Phenolated Polyisoprene

Into a 2-liter flask equipped with a stirrer and reflux condenser, there was charged 450 grams of phenol and 55 grams of polyisoprene (polymer A). To this mixture there was then added 14.3 grams of p-toluene sulfonic acid and the reaction mixture was heated to a temperature of 100° C. and maintained at this temperature for 1 hour while under a nitrogen gas atmosphere. The reacted mixture was distilled to a pot temperature of 150° C. under a pressure of 28 mm. Hg.

Analysis:
| | |
|---|---|
| Number average molecular weight | = 2500 |
| Melting point | = 164° C.–168° C. |
| Percent by weight combined phenol | = 16 based on the total weight of the isoprene polymer |
| Percent internal unsaturation | = 4 |

Preparation of Polymer E—Phenolated Polyisoprene

Into a 2-liter flask equipped with a stirrer and reflux condenser, there was charged 320 grams of thiophenol and 30 grams of polyisoprene. To this mixture there was then added 7.8 grams of p-toluene sulfonic acid and the reaction then conducted in a manner as described for polymer B.

Analysis:
| | |
|---|---|
| Number average molecular weight | = 3400 |
| Melting point | = 82° C.–84° C. |
| Percent by weight combined thiophenol | = 15 based on the total weight of the isoprene polymer |
| Percent internal unsaturation | = 15 |

The polyisoprene used in this example was a liquid product having a number average molecular weight of 3,000 and having 15 percent internal unsaturation.

Preparation of Polymer F—Phenolated Polyisoprene

Into a 2-liter flask equipped with a stirrer and reflux condenser, there was charged 1,500 grams of o-t-butylphenol and 136 grams of polysioprene (polymer A). To this mixture there was then added 16.4 grams of boron-trifluoride-phenol complex containing 23 percent by weight boron-trifluoride and the reaction then carried out in a manner described for polymer B.

Analysis:
| | |
|---|---|
| Number average molecular weight | = 2400 |
| Melting point | = 138° C.–141° C. |
| Percent by weight combined o-t-butylphenol | = 21 based on the total weight of the isoprene polymer |
| Percent internal unsaturation | = 5 |

Preparation of Polymer G—p-Dodecyl-Phenol-Formaldehyde Novolac Resin

Into a 2-liter reaction flask there was added 262 grams of p-docecyl phenol and 0.2 grams of sulfuric acid (97 percent) added thereto. This mixture was heated to a temperature of 90° C. and then cooled to a temperature of 50° C. 75 grams of formaldehyde were then added, as a 40 percent aqueous solution and the temperature of the reaction mixture was raised to 100° C. This temperature was maintained for a period of about 1.5 hours during which time the reaction mixture was continuously stirred. The reaction flask was then evacuated to a pressure of 50 millimeters of mercury and the water present in the reaction mixture was distilled off until a reaction temperature of 130° C. had been attained. This temperature was maintained until the reaction mixture had attained a ring and ball melting point of 190° F. The dodecyl phenol-formaldehyde resin was then discharged from the flask.

A masterbatch composition, the formulation of which is noted below, was compounded to a blend in a Banbury mixer.

| Masterbatch Composition I | Parts by Weight |
|---|---|
| Terpolymer of ethylene-propylene hexadiene-1,4 containing 50 percent by weight combined ethylene, 48 percent by weight combined propylene with the remainder being hexadiene-1,4 | 100 |
| Zinc oxide | 5 |
| Stearic acid | 1 |
| Carbon black | 80 |
| Naphthenic oil | 40 |
| Sulfur | 1.5 |
| Tetramethyl-thiuran monsulfide | 1.5 |
| 2-Mercaptobenzothiazole | 0.75 |

To samples of the masterbatch compositions, were added various amounts of phenolated isoprene polymers and phenol-formaldehyde resins. Each polymer was dispersed in the sample of the masterbatch by a milling operation on a two-roll mill which had been preheated to a temperature of 100°–120° C. Each composition was sheeted on the two-roll mill and cut into strips, 1 inch by 6 inches by one-eighth inch. These strips were then treated as described in table I and used in the tack test previously described. The results of these tests are shown in table I.

TABLE I

| Polymer | Parts by wt. tackifier[1] | Total time of treatment required for strips to become non-separable (hours) | | | |
| --- | --- | --- | --- | --- | --- |
| | | Florescent light | Ultraviolet light | Infrared light | High energy electrons |
| 1—Polymer B | 10 | 24 | 1 | 2 | 0.5 |
| 2—Polymer B | 7 | 30 | 1.5 | 2.5 | |
| 3—Polymer B | 5 | 40 | 3 | 4 | |
| 4—Polymer G | 10 | | 6 | | |

[1] Based on 100 parts by wt. ethylene-propylene polymer.

In table I: the source of fluorescent light was fluorescent lamps; the source of ultraviolet light was ultraviolet lamps; the source of infrared light was 250-watt, tungsten filament, clear infra-red lamps; the source of the high-energy electrons was Vander Graff generator (2,000,000-electron-volt generator—dosage delivered was 10 megareps at the rate of 1 megarep per path). The experiments of table I were carried out at a temperature of about 30° C. by providing air circulation around the specimens as they were being treated.

In order to demonstrate that temperature is not a critical aspect of this invention, strips from compositions containing 10 percent by weight polymer B were placed in an air-circulating refrigerator which was at a temperature of 20° C. and which was maintained at a temperature of 20° C. during treatment of the strips. An ultraviolet lamp was placed in the refrigerator over the strips and the strips were subjected to ultraviolet light for a period of 1.5 hours. At the end of this time the strips were removed from the oven and found to be non-separable on being subjected to the test for tack, previously described.

Similar results are achieved using polymer C-F in lieu of polymer B and G.

What is claimed is:

1. Method of improving the tack of compositions comprising ethylene-propylene polymers which can be cured to elastomeric products and a tackifier selected from the group consisting of a phenol-formaldehyde resin and a phenolated polymer of isoprene which is a homopolymer of isoprene or a copolymer or interpolymer of isoprene and a compound having at least one olefinic double bond, said homopolymer and said copolymer or interpolymer of isoprene having an average molecular weight of about 500 to about 30,000, containing less than about 50 percent internal unsaturation and phenolated with a phenol having the formula: $R(OH)_n$ wherein R is an aromatic radical having a maximum of 31 carbon atoms and $n$ is an integer of 1 to 3 inclusive; by subjecting said compositions to ionizing or nonionizing radiations for a period of time sufficient to develop tack in said compositions.

2. A method of improving the tack of a composition as defined in claim 1 by subjecting said composition to high-energy electrons for a period of time sufficient to develop tack in said compositions.

3. A method as defined in claim 1 wherein the tackifier is a phenol-formaldehyde resin.

4. A method as defined in claim 1 wherein the tackifier is a phenolated polymer of isoprene.

5. A method as defined in claim 1 wherein the tackifier is a phenolated polyisoprene.

6. A method as defined in claim 1 wherein the tackifier is polyisoprene phenolated with p-dodecylphenol.

7. A method as defined in claim 1 wherein the tackifier is a phenolated copolymer or interpolymer of isoprene and a compound having at least one olefinic double bond.

8. A method of improving the tack of a composition as defined in claim 1 by subjecting said composition to ultraviolet light for a period of time sufficient to develop tack in said composition.

9. A method as defined in claim 8 wherein the tackifier is a phenol-formaldehyde resin.

10. A method as defined in claim 8 wherein the tackifier is a phenolated polymer of isoprene.

11. A method as defined in claim 8 wherein the tackifier is a phenolated polyisoprene.

12. A method as defined in claim 8 wherein the tackifier is polyisoprene phenolated with p-dodecylphenol.

13. A method as defined in claim 8 wherein the tackifier is a phenolated copolymer or interpolymer of isoprene and a compound having at least one olefinic double bond.

14. A method of improving the tack of a composition as defined in claim 1 by subjecting said composition to infrared light for a period of time sufficient to develop tack in said composition.

15. A method as defined in claim 14 wherein the tackifier is a phenol-formaldehyde resin.

16. A method as defined in claim 14 wherein the tackifier is a phenolated polymer of isoprene.

17. A method as defined in claim 14 wherein the tackifier is a phenolated polyisoprene.

18. A method as defined in claim 14 wherein the tackifier is polyisoprene phenolated with p-dodecylphenol.

19. A method as defined in claim 14 wherein the tackifier is a phenolated copolymer or interpolymer of isoprene and a compound having at least one olefinic double bond.

20. A method of improving the tack of a composition as defined in claim 16 by subjecting said composition to fluorescent light for a period of time sufficient to develop tack in said composition.

21. A method as defined in claim 20 wherein the tackifier is a phenol-formaldehyde resin.

22. A method as defined in claim 20 wherein the tackifier is a phenolated polymer of isoprene.

23. A method as defined in claim 20 wherein the tackifier is a phenolated polyisoprene.

24. A method as defined in claim 20 wherein the tackifier is polyisoprene phenolated with p-dodecylphenol.

25. A method as defined in claim 20 wherein the tackifier is a phenolated copolymer or interpolymer of isoprene and a compound having at least one olefinic double bond.

* * * * *

PO-1050
(5/69)

UNITED STATES PATENT OFFICE
CERTIFICATE OF CORRECTION

Patent No. 3,616,362      Dated October 26, 1971

Inventor(s) Anthony C. Soldatos

It is certified that error appears in the above-identified patent and that said Letters Patent are hereby corrected as shown below:

column 2, line 71, "p + m - 5" should read --p + m = 5-- column 3, line 14, "3-chloror" should read --3-chloro--;
line 65, "cycloalipatic" should read --cycloaliphatic-- column 4, line 18, "electric discharge," should be deleted; line 30, "X-rays" should read --X-rays,-- column 7, Table 1, should read

Total time of treatment required
for strips to become non-separable

| Polymer | Parts by wt. tackifier[1] | Florescent light | Ultraviolet light | Infrared light | High energy electrons |
|---|---|---|---|---|---|
| 1-Polymer B | 10 | 24 hrs. | 1 hrs. | 2 hrs. | 30 sec. |
| 2-Polymer B | 7  | 30 "    | 1.5 "  | 2.5 "  |          |
| 3-Polymer B | 5  | 40 "    | 3 "    | 4 "    |          |
| 4-Polymer G | 10 |         | 6 "    |        |          |

[1] Based on 100 parts by wt. ethylene-propylene polymer.

column 8, line 41, "claim 16" should read --claim 1--

Signed and sealed this 16th day of May 1972.

(SEAL)
Attest:

EDWARD M. FLETCHER, JR.
Attesting Officer

ROBERT GOTTSCHALK
Commissioner of Patents